(12) United States Patent
Weber et al.

(10) Patent No.: US 6,414,468 B1
(45) Date of Patent: Jul. 2, 2002

(54) ELECTRICAL POWER DERIVATION SYSTEM

(75) Inventors: Robert E. Weber, Newport News, VA (US); Henry C. Dozier, Troy, MI (US)

(73) Assignee: Siemens Automotive Corporation, Auburn Hills, MI (US)

( * ) Notice: Subject to any disclaimer, the term of this patent is extended or adjusted under 35 U.S.C. 154(b) by 98 days.

(21) Appl. No.: 09/676,432

(22) Filed: Sep. 29, 2000

Related U.S. Application Data

(60) Provisional application No. 60/156,883, filed on Sep. 30, 1999.

(51) Int. Cl.[7] .............................. H02P 9/00; F02P 3/00
(52) U.S. Cl. ............................. 322/46; 322/37; 290/41; 123/604; 123/596
(58) Field of Search ............................ 322/25, 27, 28, 322/37, 46; 290/41; 123/594, 596, 604

(56) References Cited

U.S. PATENT DOCUMENTS

| | | | |
|---|---|---|---|
| 3,875,438 A | | 4/1975 | Tharman ..................... 310/68 |
| 3,884,207 A | | 5/1975 | Kuehn, III ............... 123/148 R |
| 4,439,721 A | | 3/1984 | Mura .......................... 322/31 |
| 4,458,195 A | | 7/1984 | Piteo .......................... 322/94 |
| 4,699,115 A | * | 10/1987 | Terada et al. ................ 123/335 |
| 5,055,700 A | * | 10/1991 | Dhyanchand .................. 290/31 |
| 5,262,711 A | | 11/1993 | Mori et al. .................... 322/28 |
| 5,294,879 A | * | 3/1994 | Freeman et al. ............... 322/23 |
| 5,479,909 A | | 1/1996 | Blakeslee et al. ........... 123/491 |
| 5,502,368 A | * | 3/1996 | Syverson et al. ........... 310/181 |
| 6,279,558 B1 | * | 8/2001 | Fukuda ........................ 123/599 |
| 2001/0052761 A1 | * | 12/2001 | Taniguchi et al. ............ 322/28 |

FOREIGN PATENT DOCUMENTS

| | | |
|---|---|---|
| EP | 0 913 290 | 5/1999 |
| WO | WO91/08609 | 6/1991 |

OTHER PUBLICATIONS

PCT International Search Report completed Apr. 24, 2001.

\* cited by examiner

*Primary Examiner*—Nicholas Ponomarenko

(57) ABSTRACT

A system for deriving electrical power from an engine includes a current inducing module that supplies current to a load such as a chargeable power source. The current inducing module preferably includes a magnet and coil arrangement. The magnet is associated with a rotating element of the engine such that the magnet passes by the coil as the engine element rotates. The current that is induced in the coil is handled using current regulating components to control the amount of power supplied to the chargeable power source. The invention provides a way to electrically power components associated with devices that do not have a battery.

14 Claims, 2 Drawing Sheets

US 6,414,468 B1

ELECTRICAL POWER DERIVATION SYSTEM

REFERENCE TO RELATED APPLICATIONS

This application claims priority to United States Provisional Application No. 60/156,883 filed on Sep. 30, 1999.

BACKGROUND OF THE INVENTION

This invention relates to a device for deriving electrical power from an engine. More particularly, this invention relates to a circuit that derives current from movement of a rotary member associated with an engine and provides that current to a chargeable power source.

There are many types of vehicles, equipment and devices that are powered by an engine. Examples include passenger vehicles, work machines, personal craft and utility devices such as tractors or lawn mowers. In some instances, a battery is included to provide power to start the engine. In most such situations, the battery is also utilized to power various accessories or components on the vehicle or device.

In some instances, however, a battery is not included. Instead, the engine is started using a pull start mechanism or some other means of providing a spark to a spark plug to start the engine. Such batteryless engines are sometimes referred to as utility engines and are typically used on conventional lawn mowers or other equipment. When no battery is included, the ability to power accessory devices or components is severely limited. There is often a need to include electrically powered devices or accessories on a device or vehicle that is powered by an engine.

Even when a battery is included, there is an increasing desire to include electrically powered components and accessories on vehicles and other devices. With the increase of such devices, a single battery cannot always provide adequate power over time. Therefore, there is a need to be able to provide electrical power to a variety of devices without relying on a battery.

This invention addresses the need to provide electrical power to other devices that are part of the same vehicle or equipment that is powered by an engine by deriving electrical power from a rotary member associated with the engine.

SUMMARY OF THE INVENTION

In general terms, this invention is a device for providing electrical power to a variety of devices through a chargeable power source. A device designed according to this invention includes an engine that has a rotating member. A current inducing module is associated with the rotating member such that rotation of the rotating member produces current. A chargeable power source is coupled with the current inducing module to receive the current. The chargeable power source is, in turn, used to provide electrical power to selected devices or components.

The preferred arrangement of the current inducing module includes a magnet that rotates with the rotating member and a coil positioned relative to the rotating member such that the magnet passes near the coil and induces a current in the coil.

The device of this invention is particularly useful in situations where the engine comprises a utility engine and the magnet is a portion of a magneto on a pull start mechanism for starting the engine. The various uses and applications for this invention along with its various advantages and features will become apparent to those skilled in the art from the following detailed description of the currently preferred embodiment. The drawings that accompany the detailed description can be briefly described as follows.

DETAILED DESCRIPTION OF A PREFERRED EMBODIMENT

A system 20 for deriving electrical power from an engine 22 includes a current inducing module 24 that provides current to a load 26. In one example, the load 26 is a chargeable power source such as a battery or a capacitor.

Figure 1:
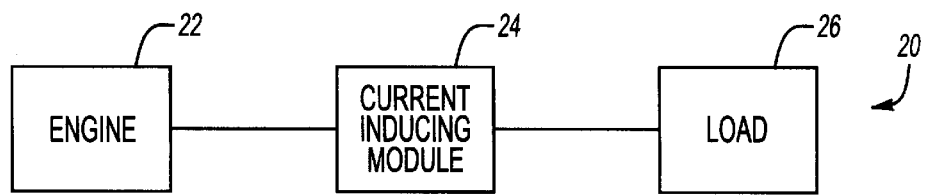
FIG. 1 schematically illustrates a system designed according to this invention.
Figure 2:
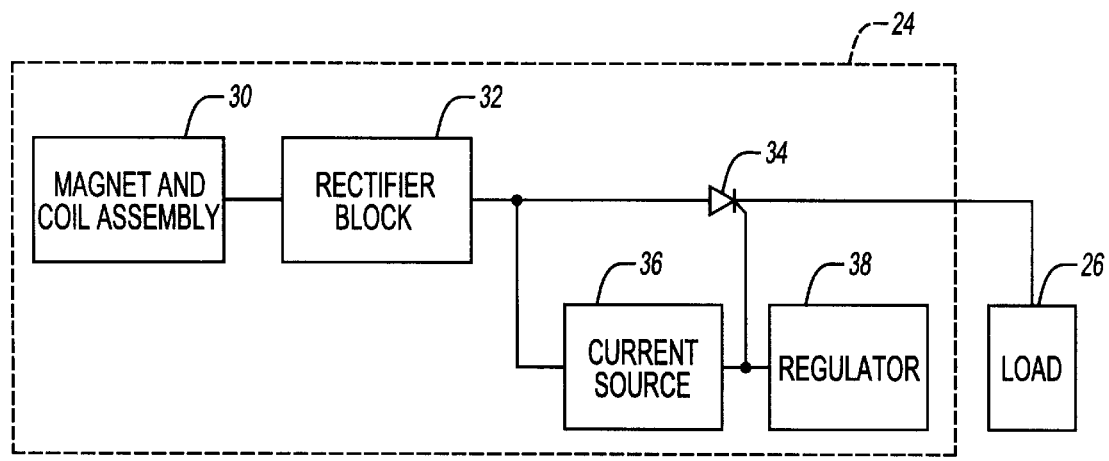
FIG. 2 schematically illustrates more details of the embodiment of FIG. 1.

FIG. 2 shows more details of the preferred arrangement of the current inducing module 24. A magnet and coil arrangement 30 preferably generates current. A rectifier portion 32 rectifies alternating current from the magnet and coil arrangement 30 so that the current has a desired polarity. A switch 34 controls the flow of current to the load 26 depending on the state of the switch. In the illustrated examples, the switch 34 is an SCR. A current source portion 36 effectively provides a current to the SCR 34 to maintain it in the desired state. A current regulator module 38 operates to control the switched state of the SCR based upon the voltage on the load 26.

A plurality of portions or modules are schematically shown in the figures for discussion purposes. Each module is described as performing a specific function, however, the divisions of elements as described are not necessary in all circumstances to accomplish the results provided by this invention. Given this description, those skilled in the art will realize that modifications to the disclosed arrangements are possible that will provide a desired result in accordance with this invention. Similarly, given this description, those skilled in the art will realize that the particular circuit components shown and described may be interchanged with other components or their functions may be incorporated into software.

An important advantage of this invention is that it provides a relatively inexpensive means for providing current and power regulation. This invention makes it possible to derive electrical power from an engine and to control or regulate that power in a cost-effective manner that makes it viable to be used with a variety of vehicles or machines.

Figure 3:
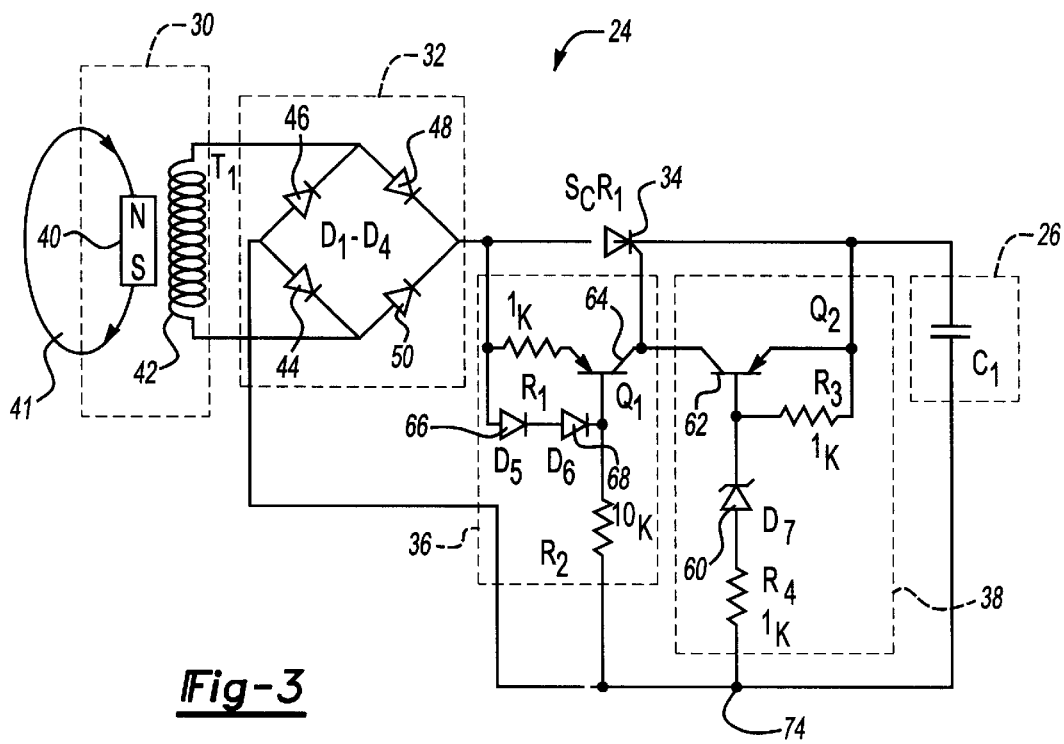
FIG. 3 is a circuit diagram showing an example embodiment of this invention.

FIG. 3 shows the currently preferred embodiment of a circuit designed according to this invention. A magnet 40 is associated with a rotating member 41 of the engine 22 so that the magnet rotates when the rotating member rotates. In one example, the rotating member 41 and the magnet 40 are parts of a magneto that is used to start the engine. In another example, the rotating member 41 is an engine flywheel.

As the magnet 40 passes by a coil 42 when the rotating member 41 rotates, alternating current is induced in the coil 42. The rectifier module 32 preferably rectifies the AC current so that the corresponding voltage only has a positive polarity. In the illustrated example, four rectifiers 44, 46, 48 and 50 are arranged to provide only positive polarity voltage to the remainder of the system.

A zener diode 60 is preferably included as part of the current regulator module 38. The break over voltage of the diode 60 preferably is chosen so that whenever the voltage on the load 26 exceeds the break over voltage, no more current is supplied to the load 26, which preferably is a chargeable power source. A capacitor is illustrated as an example chargeable power source. This invention is also useful for recharging chargeable batteries and for supplying power to other loads.

Whenever the voltage on the load 26 is below the break over voltage of the zener diode 60, then a transistor 62 is in an off state and the current supplied through a transistor 64 triggers the SCR 34 allowing current to charge the load 26. When the output voltage of the load 26 is above the zener diode break over voltage, then the transistor 62 conducts any gate trigger current and holds the SCR 34 in an off state. This regulates the conditions under which current is provided to the chargeable power source 26.

The transistor 64 within the current source module 36 preferably is associated with two diodes 66 and 68. The diode 68 compensates for the base emitter drop of the transistor 64 and the voltage drop across the resistor R1 is forced to be equal to the drop across the diode 68. This provides a gate drive current that has a slight negative temperature coefficient, which tracks the gate sensitivity of the SCR 34. This arrangement limits the trigger current supplied to the gate of the SCR 34 to a safe level even when the supply voltage varies because of changes in the rotation speed of the engine and the rotating member 41.

The circuit shown in FIG. 3 is useful for charging a chargeable power source by deriving current from the rotation of a rotary member of the engine 22. This invention, therefore provides a source of electrical power even where no separate battery or other power source are available to charge or power the load 26. This invention is particularly useful on devices or vehicles having a utility engine without a battery. The applications for this invention, however, are not so limited. Given this description, those skilled in the art will recognize the possibilities for incorporating the inventive electrical powering arrangement into any situation where a magnetic member can be associated with a rotating member of an engine to induce current that is useful to supply electrical power to a load such as a chargeable power source.

Another use of this invention is to accomplish more efficient emission controls for utility engines, which are below 5 horsepower in capacity. This invention allows for more precise control of the ignition spark supplied to the spark plug. By regulating the timing of the ignition of the engine 22 (i.e., by controlling power flow to the spark plug), this invention provides an ability to regulate emissions from an engine.

Figure 4:
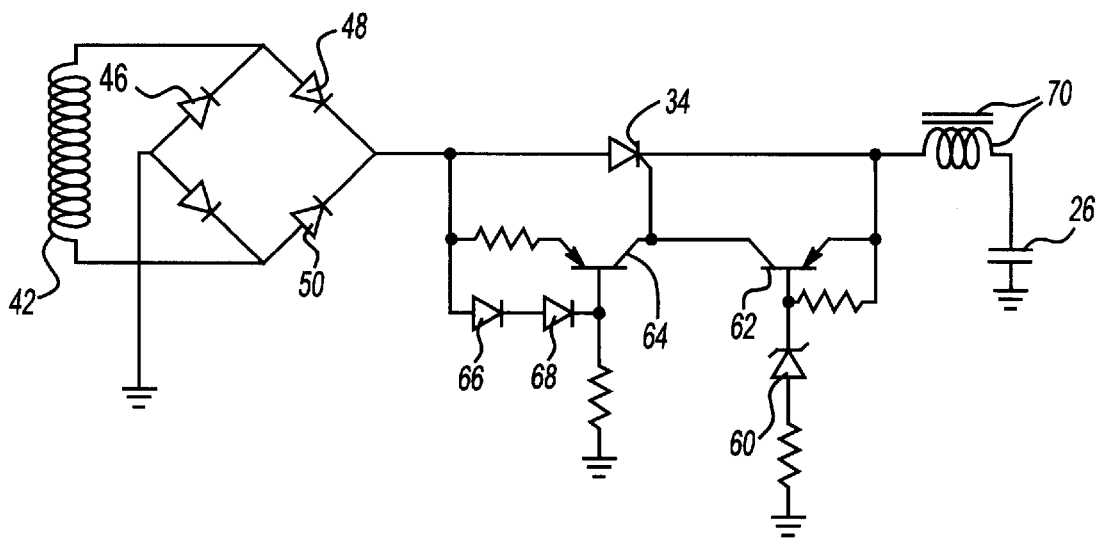
FIG. 4 shows another example circuit designed according to this invention.

Another example is shown in FIG. 4, which differs slightly from the example of FIG. 3. In this example, a current smoothing element 70 is provided, which limits current spikes or other irregularities in the current supplied to the load 26. Another difference found in the example of FIG. 4 compared to that of FIG. 3 is that the node 74 is coupled to ground in the example of FIG. 4.

Figure 5:
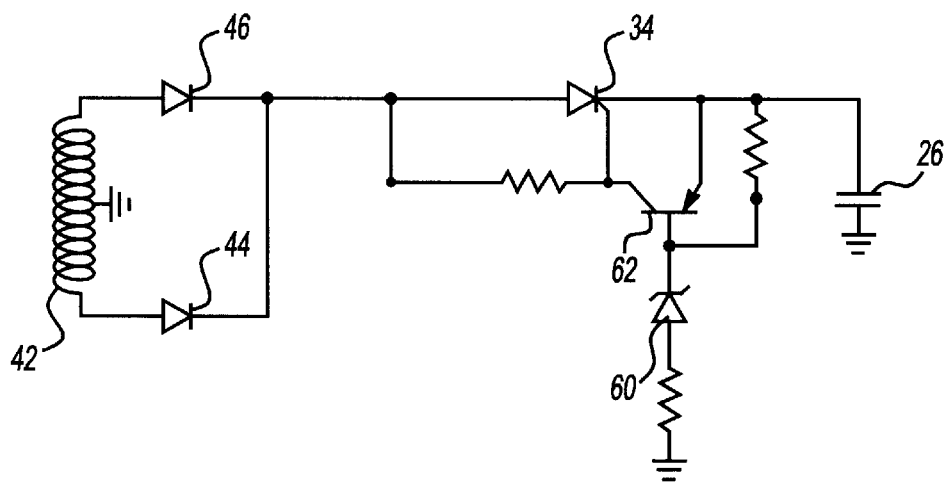
FIG. 5 shows another example circuit designed according to this invention.

The example of FIG. 5 has a modified current inducing module. The coil 42 in this example is part of a magneto used to start a utility engine. If the voltage on the capacitor 26 exceeds the break over voltage of the zener diode 60, then the transistor 62 operates to avoid triggering the gate of the SCR 34. This controls the amount of current supplied to the capacitor 26. This particular example is believed to be useful for devices that have a utility engine that provides approximately 3.5 horsepower.

The preceding description is exemplary rather than limiting in nature. Variations and modifications to the disclosed embodiments may become apparent to those skilled in the art that do not necessarily depart from the purview and spirit of this invention. The scope of legal protection given to this invention can only be determined by studying the following claims.

We claim:

1. A power generating device, comprising:
   an engine;
   a rotating member associated with the engine;
   a manually operated pull start mechanism that causes an initial rotation of the rotating member;
   a current inducing module associated with the rotating member such that rotation of the rotating member produces current; and
   a chargeable power source coupled with the current inducing module to receive the current.

2. The device of claim 1, wherein the current inducing module includes a magnet that rotates with the rotating member and a coil positioned relative to the rotating member such that the magnet passes near the coil and induces a current in the coil.

3. The device of claim 2, wherein the engine comprises a utility engine and the magnet is a portion of a magneto on the pull start mechanism.

4. The device of claim 1, including current regulating elements that include a switch that is switched between a first state where current flows to the chargeable power source and a second state where no current flows to the chargeable power source and a compensation portion that limits a trigger current supplied to the switch to compensate for variations in voltage that occur as a result of changes in a speed of rotation of the rotating member.

5. The device of claim 4, wherein the switch comprises an SCR and the compensation portion provides a gate drive current with a negative temperature coefficient that tracks a gate sensitivity of the SCR to limit the current supplied to the gate of the SCR.

6. The device of claim 5, wherein the compensation portion comprises a transistor having one lead coupled with the gate of the SCR and a resistance element in parallel with a rectifier across the other two leads of the transistor such that a voltage drop across the resistive element must equal a voltage drop across the rectifier.

7. The device of claim 1, including current regulating elements that regulate the current that flows to the chargeable power source.

8. The device of claim 7, wherein the regulating elements include a rectifier portion that rectifies the current before the current is provided to the chargeable power source.

9. The device of claim 7, wherein the regulating elements include a zener diode having a chosen break over voltage such that no current flows to the chargeable power source unless a voltage of the power source is below the break over voltage.

10. An assembly for deriving electrical power from a batteryless spark ignited engine, comprising a rotating member that is associated with a manual pull start mechanism;
    a magnetic member associated with the rotating member so that the magnetic member moves when the rotating member rotates;

a coil positioned relative to the magnetic member such that movement of the magnetic member results in a current in the coil;

a current regulating module that regulates an amount of current flowing through the current regulating module to be supplied to a load.

11. The assembly of claim 10, wherein the rotating member comprises a flywheel of a magneto that is used to start the engine.

12. The device of claim 10, including current regulating elements that include a switch that is switched between a first state where current flows to the chargeable power source and a second state where no current flows to the chargeable power source and a compensation portion that limits a trigger current supplied to the switch to compensate for variations in voltage that occur as a result of changes in a speed of rotation of the rotating member.

13. The device of claim 12, wherein the switch comprises an SCR and the compensation portion provides a gate drive current with a negative temperature coefficient that tracks a gate sensitivity of the SCR to limit the current supplied to the gate of the SCR.

14. The device of claim 13, wherein the compensation portion comprises a transistor having one lead coupled with the gate of the SCR and a resistance element in parallel with a rectifier across the other two leads of the transistor such that a voltage drop across the resistive element must equal a voltage drop across the rectifier.

* * * * *